(12) United States Patent
Patrawala

(10) Patent No.: US 7,797,200 B2
(45) Date of Patent: Sep. 14, 2010

(54) METHODS, SYSTEMS, AND COMPUTER PROGRAM PRODUCTS FOR PROVIDING WEBSITE MANAGEMENT SERVICES

(75) Inventor: Zakir Patrawala, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1302 days.

(21) Appl. No.: 11/314,901

(22) Filed: Dec. 20, 2005

(65) Prior Publication Data

US 2007/0150363 A1 Jun. 28, 2007

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS 6,738,933 B2 * 5/2004 Fraenkel et al. ............... 714/47

OTHER PUBLICATIONS

Web site tracker, Amy K Larsen. InformationWeek. Manhasset: Jul. 12, 1999. , Iss. 743; p. 85, downloaded from ProQuestrDirect on the Internet on Dec. 20, 2009, 2 pages.*
Ashok Kumar, Sumant Vashisth, Introduction to environmental business on World Wide Web, Environmental Progress. New York: Spring 1997. vol. 16, Iss. 1; p. S11, downloaded from ProQuestDirect on the Internet on Jun. 15, 2010, 12 pages.*

* cited by examiner

*Primary Examiner*—James Zurita
(74) *Attorney, Agent, or Firm*—Cantor Colburn LLP

(57) ABSTRACT

A method, system, and computer program product for providing website management services is provided. The method includes providing technical services for a website including options that are configurable by a representative of the website. The technical services include at least one of: verifying operability of web page links for the website, and monitoring performance characteristics of the website.

20 Claims, 15 Drawing Sheets

Errors from 4:58 PM 5/17/04 to 4:58 PM 10/4/04

| Time | Monitor | Status |
|---|---|---|
| 4:49 AM 8/26/04 | Links Checker Home | 4109 errors, 25000 links, 3289 graphics, average 1072 ms, http://home.XYZ.net/news, http://home.XYZ.net/creditreport, http://home.XYZ.net/*/s/context.dll? |
| 1:55 AM 9/10/04 | Links Checker Home | 1152 errors, 25000 links, 3317 graphics, average 815 ms, http://home.XYZ.net/*/s/context.dll? |
| 12:38 PM 9/17/04 | Links Checker Home | 1302 errors, 25000 links, 3105 graphics, average 1131 ms, http://home.XYZ.net/s/editorial.dll? |
| 10:21 PM 9/24/04 | Links Checker Home | 1471 errors, 25000 links, 2999 graphics, average 1040 ms, http://216.77.188.5, http://home.XYZ.net/cobrandimages/spacer.gif. |
| 1:53 PM 9/29/04 | Links Checker Home | 128 errors, 25000 links, 2989 graphics, average 927 ms, http://home.XYZ.net/mlb, http://home.XYZ.net/s/context.dll? |

*FIG. 10*

METHODS, SYSTEMS, AND COMPUTER PROGRAM PRODUCTS FOR PROVIDING WEBSITE MANAGEMENT SERVICES

BACKGROUND

The present invention relates generally to Web-based services, and more particularly, to methods, systems, and computer program products for providing website management services.

Currently, there are increasing numbers of consumers turning to the Internet to find products, services, and information. As a result, many businesses are also turning to the Internet as a way to increase the exposure of their products and services to the public with the ultimate goal of increasing revenue. While large enterprises often hire specialists to design and operate their websites (e.g., creating web pages, links, shopping cart, search tools, email, etc.), many smaller businesses rely on service providers (e.g., shared web hosting providers) as a more cost-effective alternative for conducting business online.

Shared web hosting is typically implemented by linking the hosted website with a uniform resource locator (URL) of the hosting provider. When a user system visits the website, it is transparently redirected to the URL of the hosting provider, which in turn, performs functions for the owner/operator of the website, such as providing access to applications, content, and related services on behalf of the website owner/operator. Shared web hosting has become popular with smaller business that do not have the time, money, and/or resources to devote to the various activities associated with creating and maintaining a website. Unfortunately, however, even if these smaller businesses utilize the services of a shared web hosting provider, they typically lack the technical knowledge associated with operating a website and, in particular, monitoring its performance and resolving performance issues.

What is needed, therefore, is a way to provide technical assistance to website owners/operators for maintaining the operational efficiency of the websites.

BRIEF SUMMARY

Exemplary embodiments include a method for providing website management services. The method includes providing technical services for a website including options that are configurable by a representative of the website. The technical services include at least one of: verifying operability of web page links for the website, and monitoring performance characteristics of the website.

Exemplary embodiments also include a system for providing website management services. The system includes a processor and a web manager application executing on the processor. The web manager application provides technical services for a website including options that are configurable by a representative of the website. The technical services include at least one of: verifying operability of web page links for the website, and monitoring performance characteristics of the website.

Additional exemplary embodiments include a computer program product for providing website management services. The computer program product includes instructions for executing a method. The method includes providing technical services for a website including options that are configurable by a representative of the website. The technical services include at least one of: verifying operability of web page links for the website, and monitoring performance characteristics of the website.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 10 depicts a user interface screen depicting sample error reports (in text form) resulting from the links checker services in exemplary embodiments;

The detailed description explains the exemplary embodiments, together with advantages and features, by way of example with reference to the drawings.

DETAILED DESCRIPTION OF EXEMPLARY EMBODIMENTS

In accordance with exemplary embodiments, website management services are described for providing technical assistance to website owners/operators who do not have the time, resources, and/or desire to perform various activities required for keeping a website operating in an efficient manner. The website management services include periodic link verification and site monitoring tools that include customizable options facilitated through a user interface.

Figure 1:
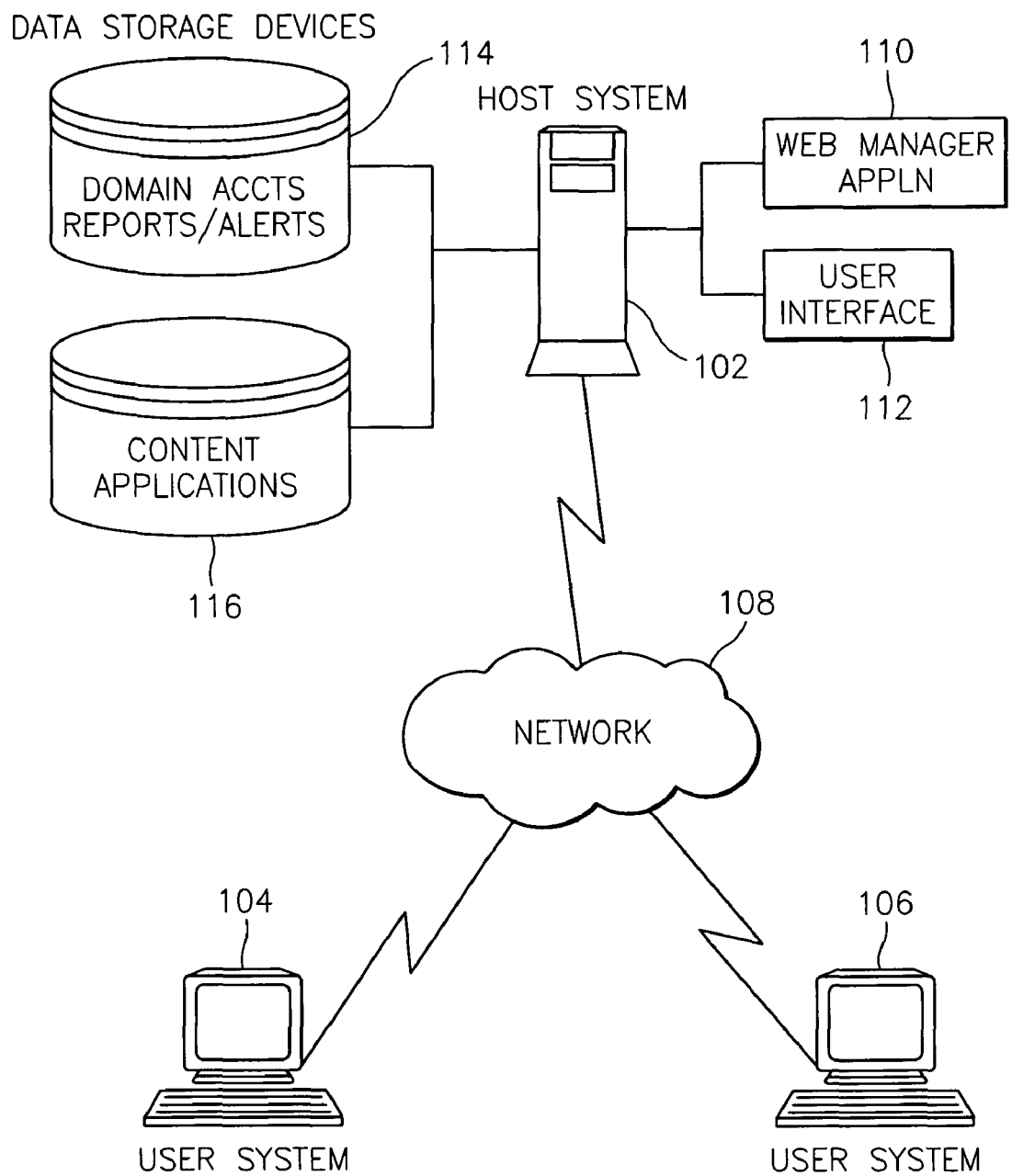
FIG. 1 depicts a block diagram of a system upon which the website management services may be implemented in exemplary embodiments.

Turning now to FIG. 1, a system for implementing the website management services will now be described in accordance with exemplary embodiments. The system of FIG. 1 includes a host system 102 in communication with user systems 104 and 106 over one or more networks 108. Although only two user systems are shown for ease of illustration, it should be appreciated than any number of user systems may be used according to exemplary embodiments. The host system 102 executes computer instructions for performing various Web-based services (e.g., shared Web hosting, domain name registration, etc.). In addition, the host system 102 executes one or more applications for performing website management services, which include verifying links for websites of subscribing entities (e.g., user systems 104 and/or 106) and/or monitoring the performance of websites for these subscribing entities.

According to an exemplary embodiment, verifying links for websites (also referred to herein as 'links checker' services) includes periodically or regularly verifying the links (or a subset thereof) associated with a subscriber's website based upon subscriber-defined parameters and providing this information back to the subscriber. Monitoring the performance of websites (also referred to herein as 'site monitor' services) includes monitoring subscriber-defined characteristics of the website's performance (e.g., ensuring user-selected databases, web pages, etc. are operating efficiently) and providing this information back to the subscriber. These and other features of the website management services may be implemented by one or more applications executing on the host system 102, collectively referred to as a web manager application 110. The web manager application 110 also includes a user interface 112 component that enables subscribing entities (e.g., user systems 104, 106) to configure customized options available for the links checker and monitoring services through the user interface 112. These and other features of the web manager application 110 and the user interface 112 will be described further herein.

User systems 104, 106 are associated with entities that conduct activities via the World Wide Web (also referred to as "Web"). Each of these entities may host their own web content, applications, services or may utilize a third party hosting entity (e.g., host system 102) for this purpose. As described throughout the exemplary embodiments, the term "user" refers to an individual operating one of user systems 104, 106.

Each user system 104, 106 may be implemented using a general-purpose computer executing a computer program for carrying out the processes described herein. The user systems 104, 106 may be personal computers (e.g., a lap top, a personal digital assistant) or host attached terminals. If the user systems 104, 106 are personal computers, the processing described herein may be shared by user systems 104, 106 and the host system 102 (e.g., by providing an applet to the user systems).

The network(s) 108 may be any type of known networks including, but not limited to, a wide area network (WAN), a local area network (LAN), a global network (e.g. Internet), a virtual private network (VPN), an intranet, or a combination thereof. The network(s) 108 may be implemented using wireless network technologies or any kind of physical network implementation known in the art. User systems 104, 106 may be coupled to the host system through multiple networks (e.g., intranet and Internet) so that not all user systems 104, 106 are coupled to the host system 102 through the same network. One or more of the user systems 104, 106 and the host system 102 may be connected to the network 108 in a wireless fashion.

According to an exemplary embodiment, host system 102 is in communication with storage devices 114, 116. Storage device 114 stores a variety of information including, e.g., domain accounts for subscribing entities (e.g., user systems 104, 106), as well as reports and alerts that are generated via the web manager application 110. In exemplary embodiments, host system 102 provides shared web hosting services to subscribing entities. Storage device 116 stores information such as content, applications, databases, etc., which are associated with each subscriber's website (i.e., the host system 102 hosts the subscriber's website). Storage devices 114, 116 may be implemented using a variety of devices for storing electronic information. It will be understood that the storage devices 114, 116 may be implemented using memory contained in the host system 102 or may be separate physical devices. Further, although two storage devices are shown for ease of illustration, it should be appreciated that the storage devices may be integrated into a single device, or more than two storage devices may be used. The storage devices 114, 116 are logically addressable as consolidated data sources across a distributed environment that includes network 108. Information stored in the storage devices 114, 116 may be retrieved and manipulated via the host system 102.

The host system 102 depicted in FIG. 1 may be implemented using one or more servers operating in response to a computer program stored in a storage medium accessible by the server(s). The host system 102 may operate as a network server (e.g., a web server) to communicate with the user systems 104, 106. The host system 102 handles sending and receiving information to and from the user systems 104, 106 and can perform associated tasks. The host system 102 may also include a firewall to prevent unauthorized access to the host system 102 and enforce any limitations on authorized access. For instance, an administrator may have access to the entire system and have authority to modify portions of the system. A firewall may be implemented using conventional hardware and/or software as is known in the art.

The host system 102 may also operate as an application server. The host system 102 executes one or more computer programs to provide website management services (e.g., web manager application 110 and user interface 112). Processing may be shared by the user systems 104, 106 and the host system 102 by providing an application (e.g., java applet) to the user systems 104, 106. Alternatively, the user systems 104, 106 can include stand-alone software applications for performing a portion of the processing described herein. As previously described, it is understood that separate servers may be utilized to implement the network server functions and the application server functions.

Figure 2:
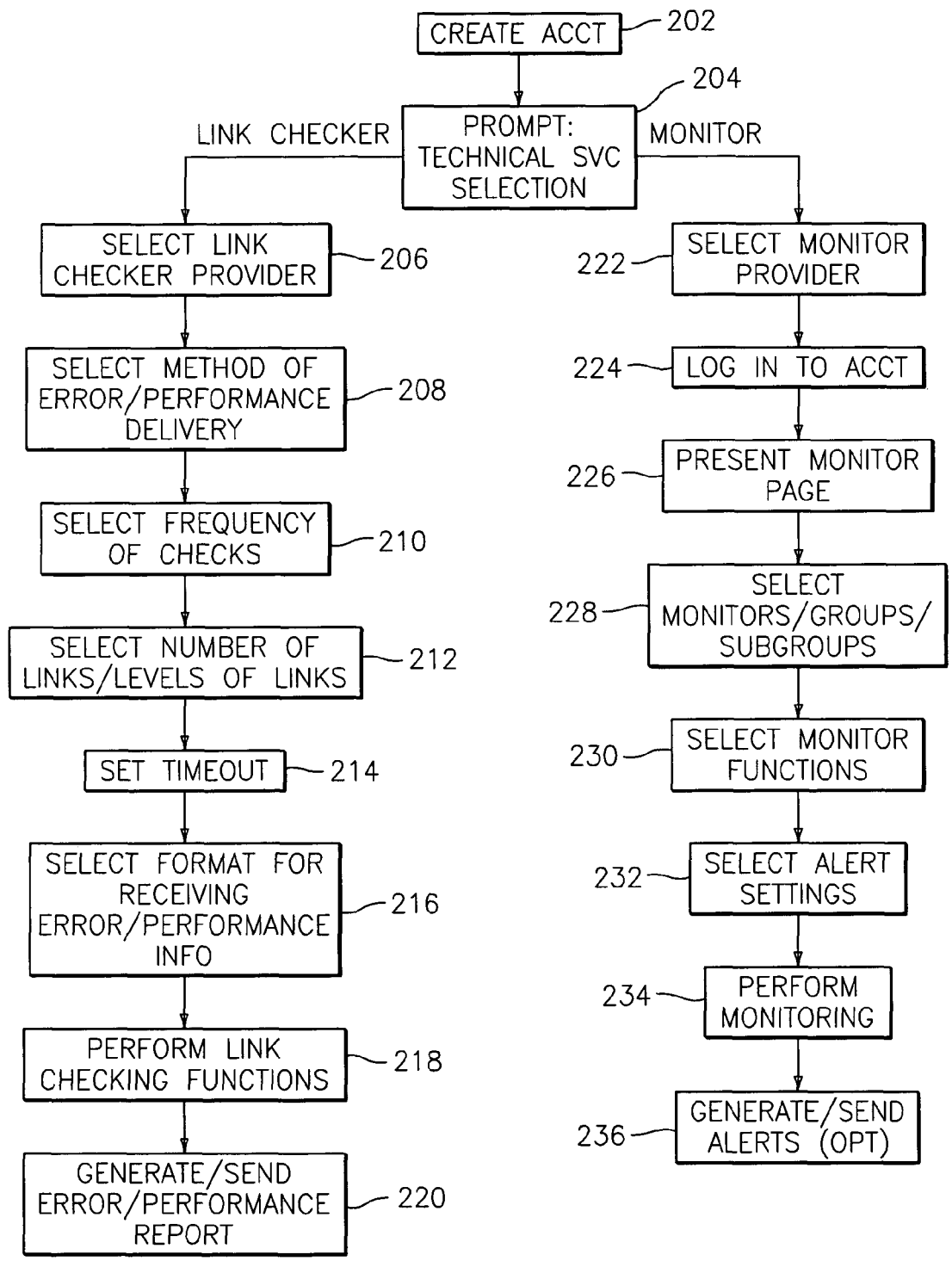
FIG. 2 is flow diagram describing a process for implementing the website management services in exemplary embodiments.

Turning now to FIG. 2, a process for implementing the website management services will now be described in accordance with exemplary embodiments. As indicated above, the web manager application 110 may reside on host system 102 and may be accessed by user systems 104, 106 via network 108 (e.g., user system 104, 106 access a website of the host system 102 and provide input via user interface screens presented by the web manager application 110 and user interface 112). Alternatively, the web manager application 110 may be downloaded from the host system 102 to the user systems 104, 106 via network 108, or may be installed via a tangible medium (e.g., hard disk, floppy disk, etc.) executing on the user systems 104, 106. It will be appreciated that while the website management services will be described herein from the perspective of a user at user system 104, other user systems may be employed for implementing the processes described herein.

Figure 3:
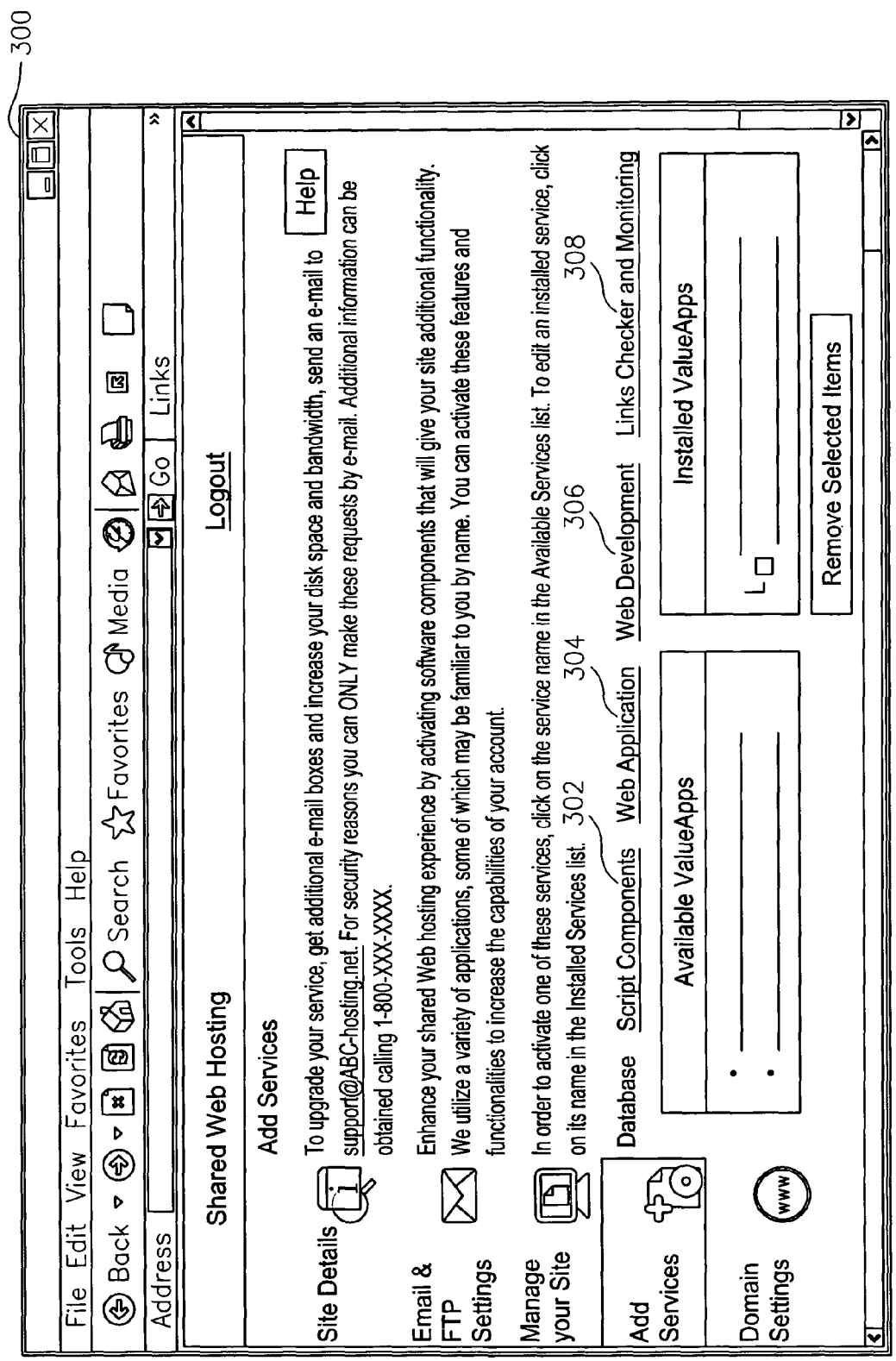
FIG. 3 depicts a user interface screen depicting shared web hosting options for selection by a user of the website management services in exemplary embodiments.

At step 202, an account is created for the user system 104 and is stored in data storage device 114. If the website management services provided by the host system 102 include web hosting, then the account may be created when the user subscribes to web hosting services. FIG. 3 depicts a user interface screen as seen by a user that has subscribed to web hosting services. As shown in the user interface screen 300 of FIG. 3, the user is provided with web hosting options Script Components 302, Web Application 304, and Web Development 306. Also included is an option for selecting the Links Checker and Monitoring 308 services, which are components of the web management services described herein. It will be understood that the user interface screen 300 of FIG. 3 may be modified to exclude the web hosting components (e.g., components 302-306) whereby a third party entity (other than the host system 102) provides web hosting, or alternatively, where the user entity hosts its own website. The website management services described herein are enabled via the Links Checker and Monitoring 308 component. If the user selects the Links Checker and Monitoring 308 component, the web manager application 110 presents two additional options via a window 402 of a user interface screen 400, a sample of which is shown in FIG. 4.

Figure 4:
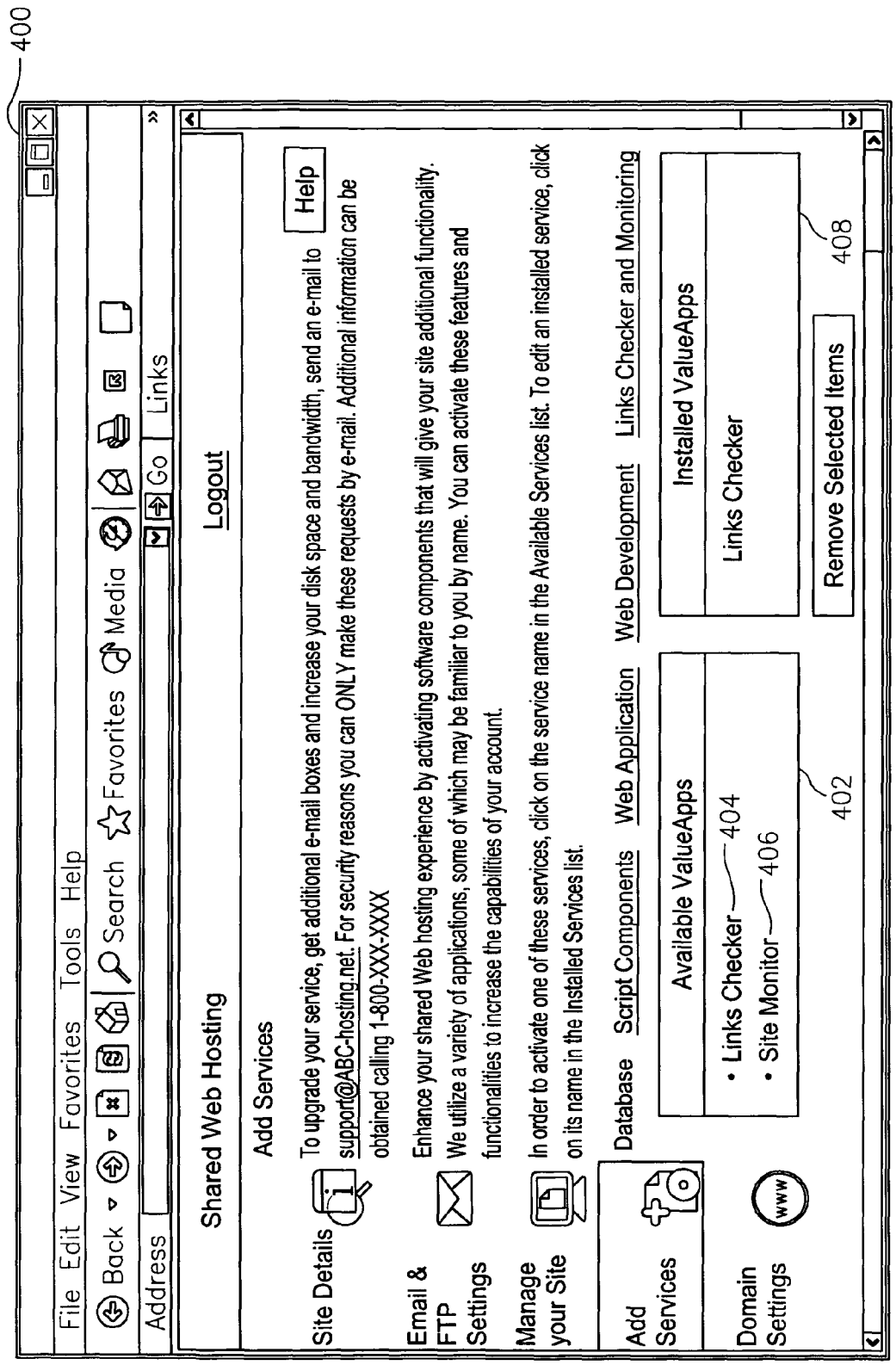
FIG. 4 depicts a user interface screen depicting links checker and monitoring options selectable by a user of the website management services in exemplary embodiments.
Figure 5:
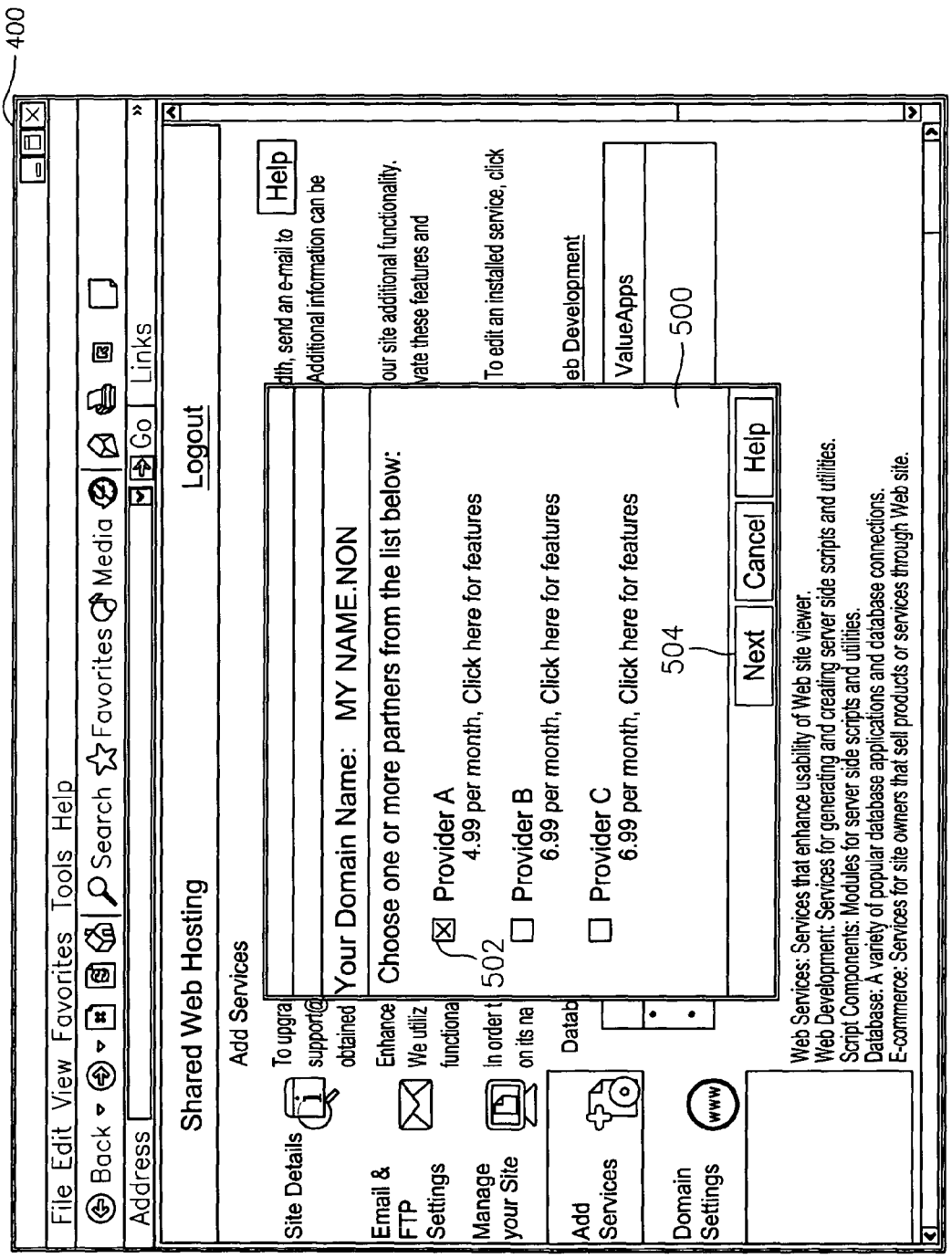
FIG. 5 depicts a user interface screen and dialog box for selecting a service entity for providing the website management services in exemplary embodiments.

As shown in FIG. 4, the two options include Links Checker 404 and Site Monitoring 406. The user selects from these options at step 204. Upon selection, the user is subscribed to the selected service and the web manager application 110 displays the selection in a second window 408. As shown in the second window 408 of user interface screen 400, the user has selected the Links Checker 404 component. By clicking on this component, the web manager application 110 presents a set up dialog box 500, as shown in FIG. 5. The website management services enable the user to select from multiple links checker provider entities for performing the links checker services. While multiple links checker provider entities are shown in dialog box 500, it will be understood that the web management services (including the links checker services) may be provided by a single provider entity. If multiple links checker provider entities are implemented, the web manager application 110 provides the functionality to customize the links checker features available to subscribing entities based upon the requirements set forth by each provider entity.

The user selects a provider from the dialog box 500 at step 206. As shown in the dialog box 500 of FIG. 5, the user has selected Provider A 502. The website management services may also provide additional information regarding the available links checker providers, such as the costs of these services and any additional features provided.

Figure 6:
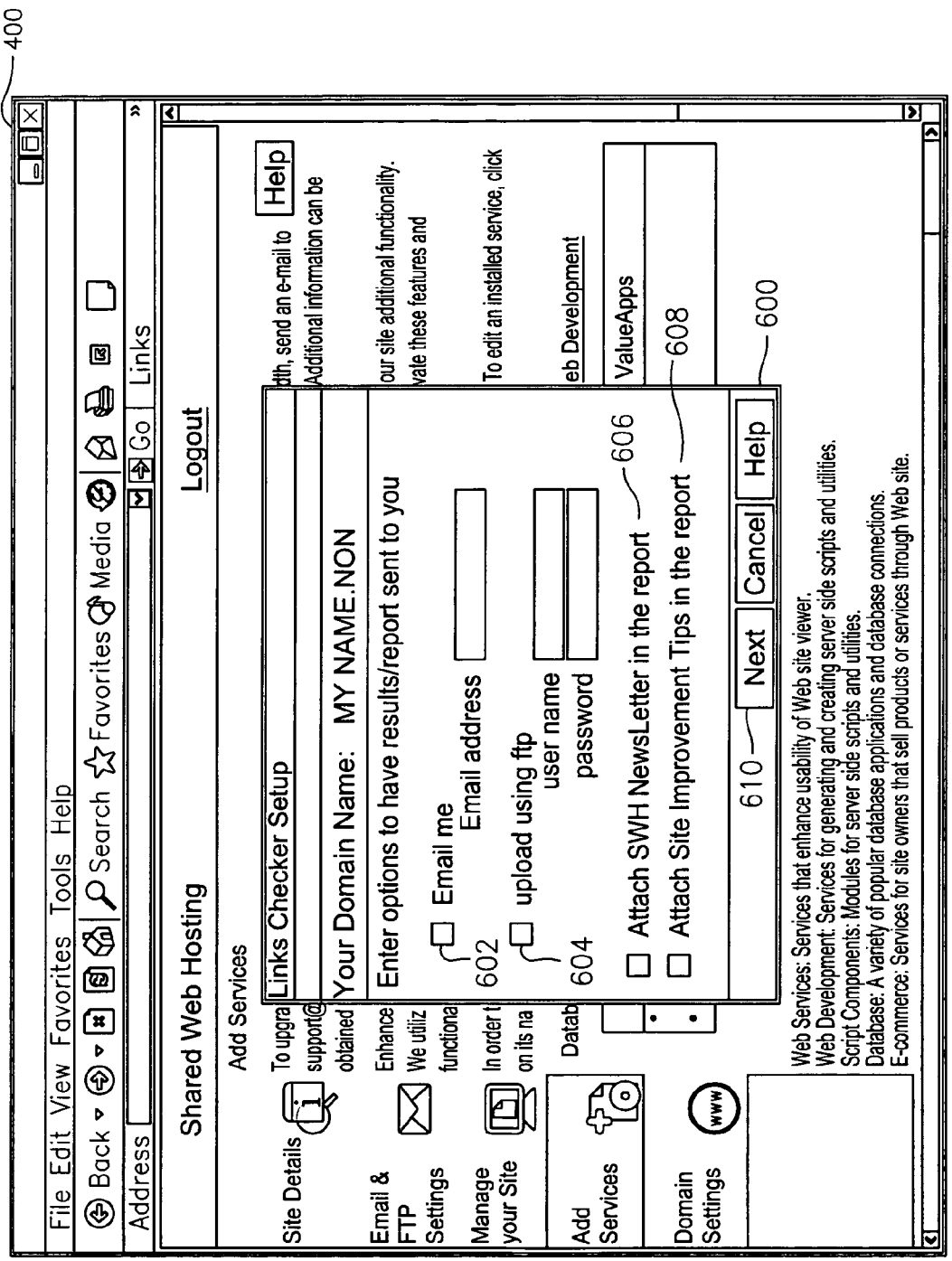
FIG. 6 depicts a user interface screen and dialog box for selecting a mode of receiving error and performance reports resulting from the links checker services in exemplary embodiments.

Upon completion, the user selects 'Next' 504 and the web manager application 110 presents a second dialog box 600 as shown in FIG. 6. It will be understood by those skilled in the art that the information presented in the second dialog box 600 (and subsequent dialog boxes) may differ depending upon which links checker provider entity is selected by the user via dialog box 500. The second dialog box 600 provides options for selecting a mode of delivering results of the links checker services. As shown in the second dialog box 600 of FIG. 6, sample options include email 602 and FTP 604.

In addition, the links checker services may include an option for providing the user with newsletters from the links checker provider entity via option 606 and customized information for improving the operation of the user's website via option 608. For example, the links checker provider entity may determine that an increase in error rates detected as a result of performing the links checker services may be attributed to increased activity occurring at the user's website (e.g., excessive timeouts). The links checker provider entity may provide useful information to the user for minimizing the error rates via option 608, which is enabled via the dialog box 600 of FIG. 6. Once the user has selected the mode of delivery via dialog box 600 at step 208, the user selects 'Next' 610, which causes the web manager application 110 to present a third dialog box 700 as shown in FIG. 7.

The user is prompted to configure links checker service options, such as selecting the frequency 702 of the links checked performed by these services at step 210, whether external links should be checked via option 704, a maximum number of links to be checked via option 706 at step 212, and a maximum number of hops or levels to be checked via option 708 at step 212. If the number of links associated with an entity's website is high, it may be cost-preventative and time-consuming to select each and every link for checking. The same may be also true for the number of hops or levels associated with each link. The web manager application 110 enables the user to determine the maximum number of links to verify for a given period.

Figure 7:
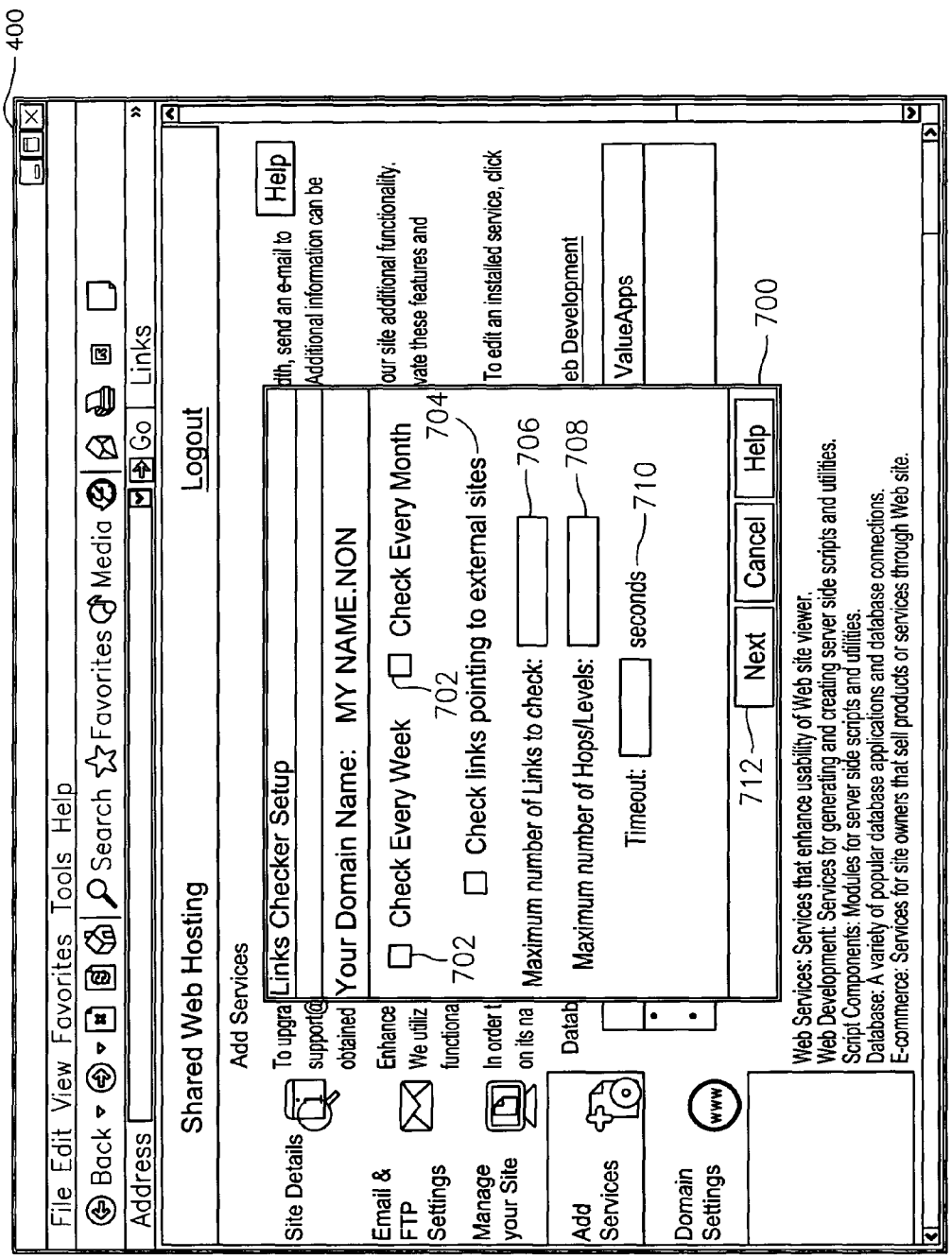
FIG. 7 depicts a user interface screen and dialog box for selecting configuration options for the links checker services in exemplary embodiments.

The third dialog box 700 of FIG. 7 also enables a user to select an amount of time for which the links will be examined before timing out (e.g., 60 seconds) via option 710 at step 214. Once this information has been entered, the user selects 'Next' 712 and the web manager application 110 presents a fourth dialog box 800 as shown in FIG. 8.

Figure 8:
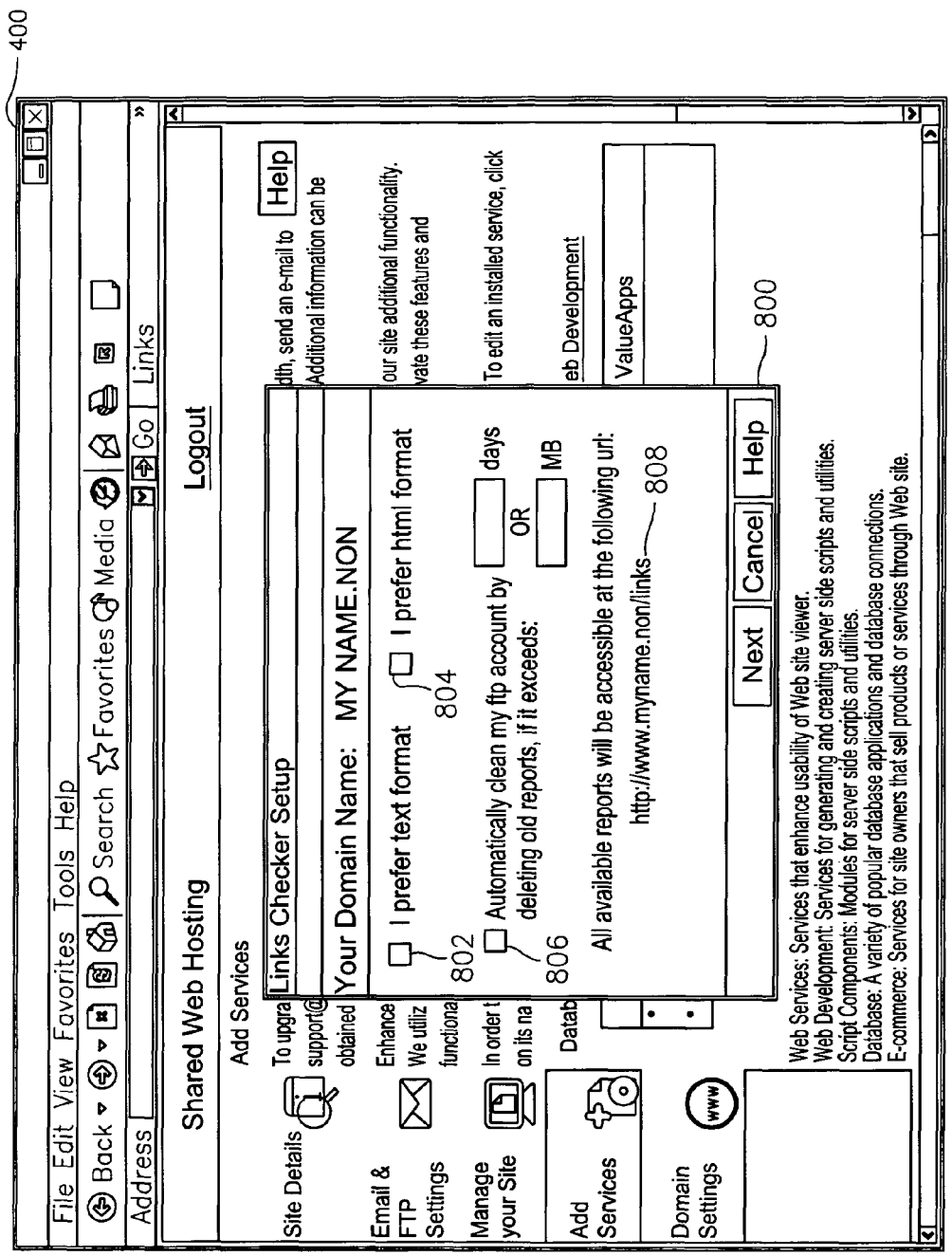
FIG. 8 depicts a user interface screen and dialog box for selecting configuration options regarding error reports for the links checker services in exemplary embodiments.

The web manager application 110 enables a user to select a format for receiving the performance/error information via the fourth dialog box 800 of FIG. 8. As shown in dialog box 800, the user may select from text format (option 802), HTML format (option 804), or other suitable formats (not shown). In addition, the web manager 110 may provide a service for automatically purging old information from the user's account via option 806. The dialog box 800 may further provide a link 808 to which the user may access this performance/error information. The user makes these selections at step 216.

Figure 9:
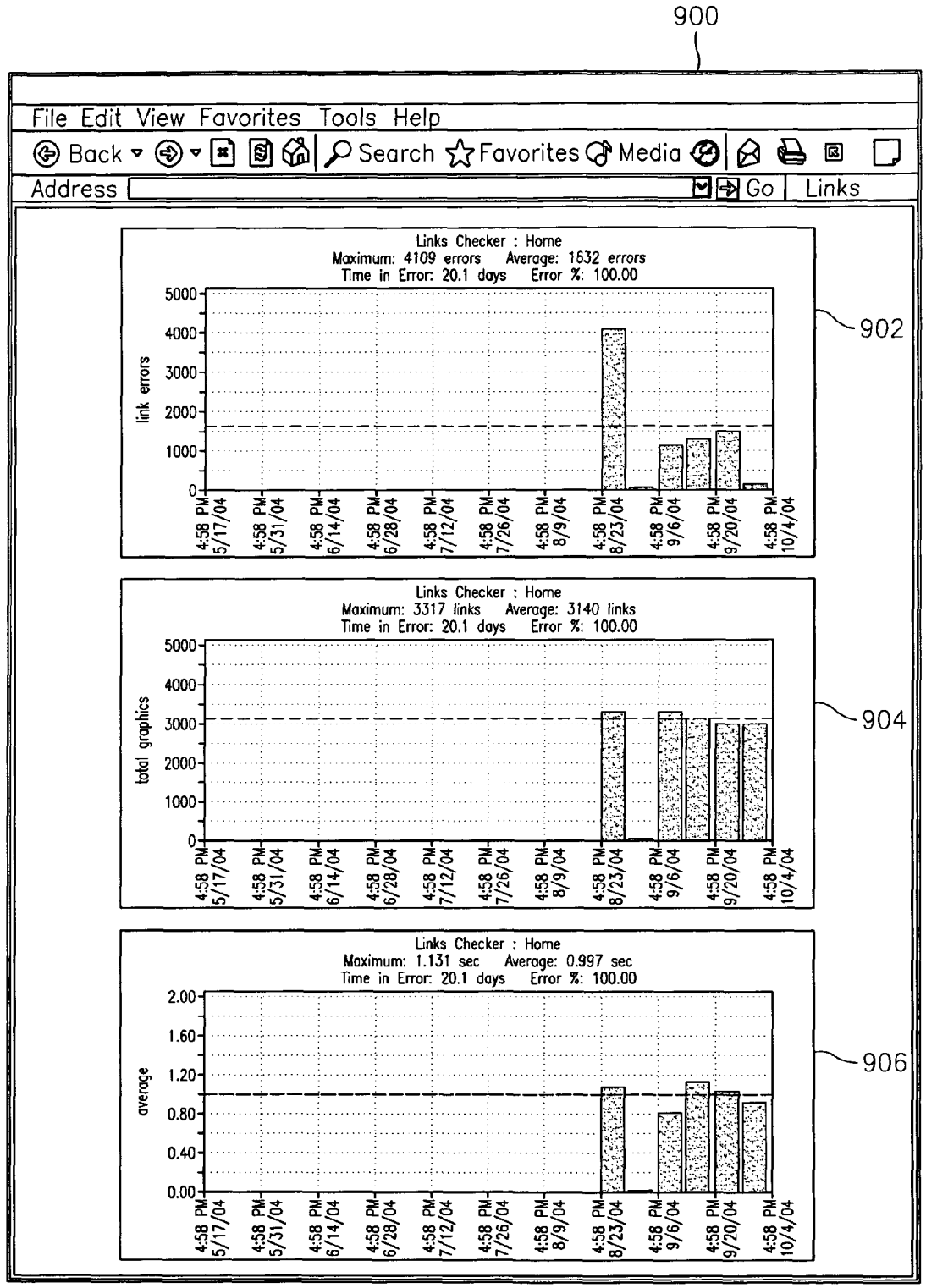
FIG. 9 depicts a user interface screen depicting sample error reports (in graphical form) resulting from the links checker services in exemplary embodiments.

Once these options are selected, the web manager application 110 is ready to begin links checker services. These services are provided in accordance with the configured options described above in second through fourth dialog boxes at step 218. When the user is ready to view the performance/error information, the user accesses the link 808, and the web manager application 110 compiles and presents performance/error reports at step 220, samples of which are shown in the user interface screens 900 and 1000 of FIGS. 9 and 10, respectively. The performance reports shown in FIG. 9 represent a graphical depiction of the results, while those shown in FIG. 10 represent a text version of the results. The first report 902 shown in FIG. 9 is directed to a number of detected link errors over a selected period of time (e.g., a "404 error" message or a timeout error). The second report 904 also shown in FIG. 9 is directed to a number of image errors detected over a period of time (e.g., image in link not found error message reflected by an 'x' encased in a small box. The third report 906 reflects the average number of errors for the period of time.

Figure 11:
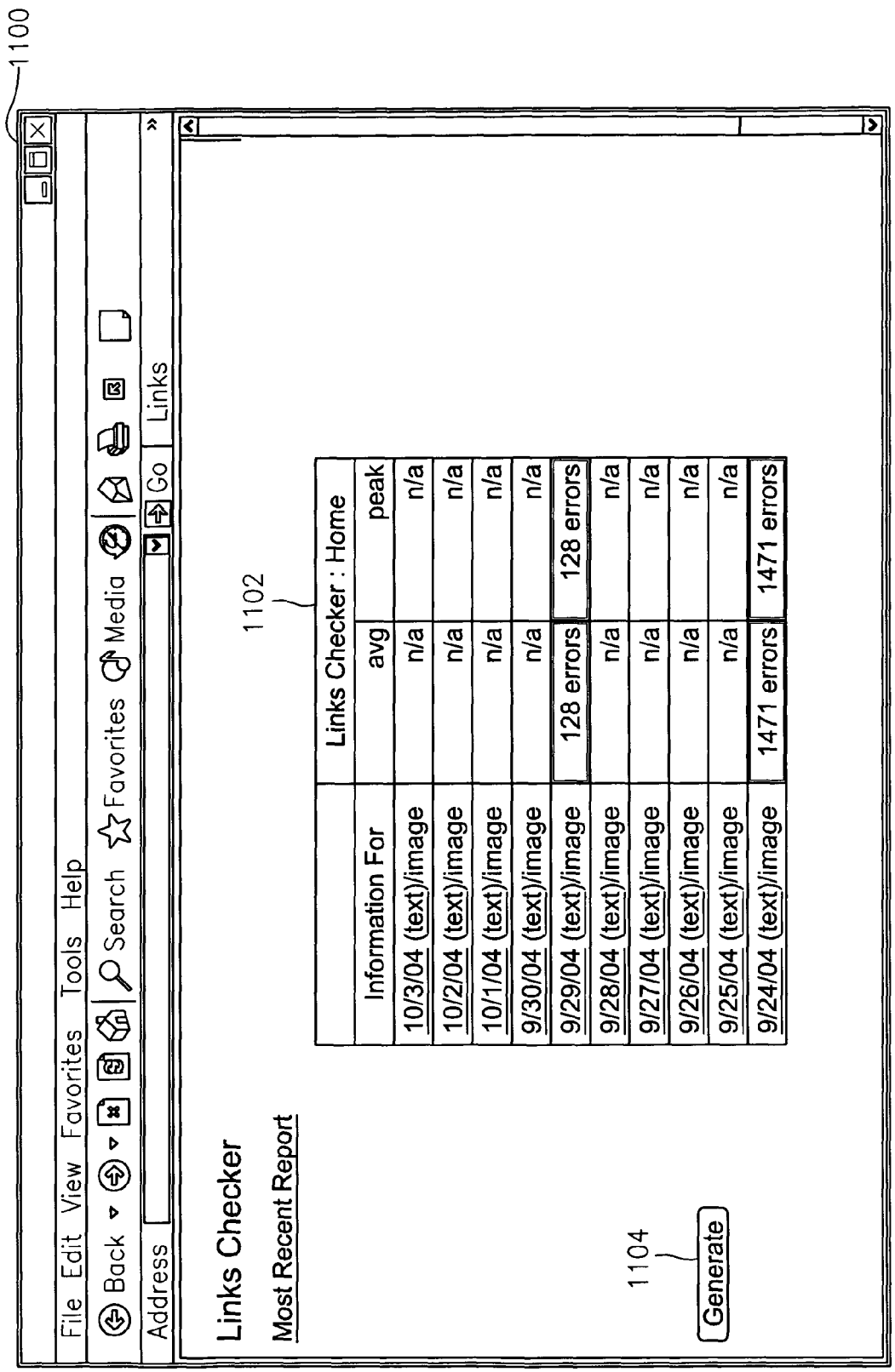
FIG. 11 depicts a user interface screen depicting links for accessing previous error reports resulting from the links checker services in exemplary embodiments.

The web manager application 110 further enables a user to review previous performance/error reports performed over time. A user interface screen 1100 depicting a list 1102 of previous performance/error reports is shown in FIG. 11. As shown in the list of reports, the user may select a text version or a graphical version of each of these reports. Once the selection is made, the user clicks on 'Generate' 1104 and the web manager application 110 recreates the report selected by the user.

As indicated above, the website management services provide both links checker services and site monitoring services. Turning back to the dialog box 400 of FIG. 4, the user selects the Site Monitoring option 406, which causes the web manager application 110 to create a subscription for this service and display the selected service (not shown) in the second window 408. By clicking on this option 406 in the second window 408, the web manager application 110 will present a set up dialog box 500, as shown in FIG. 5. As described above with respect to the links checker services, the website management services enable the user to select from multiple site monitor provider entities for performing the site monitoring services. While multiple site monitor provider entities are shown in dialog box 500, it will be understood that the web management services may be provided by a single provider entity. If multiple site monitor provider entities are implemented, the web manager application 110 provides the functionality to customize the site monitoring features available to subscribing entities based upon the requirements set forth by each provider entity.

Figure 12:
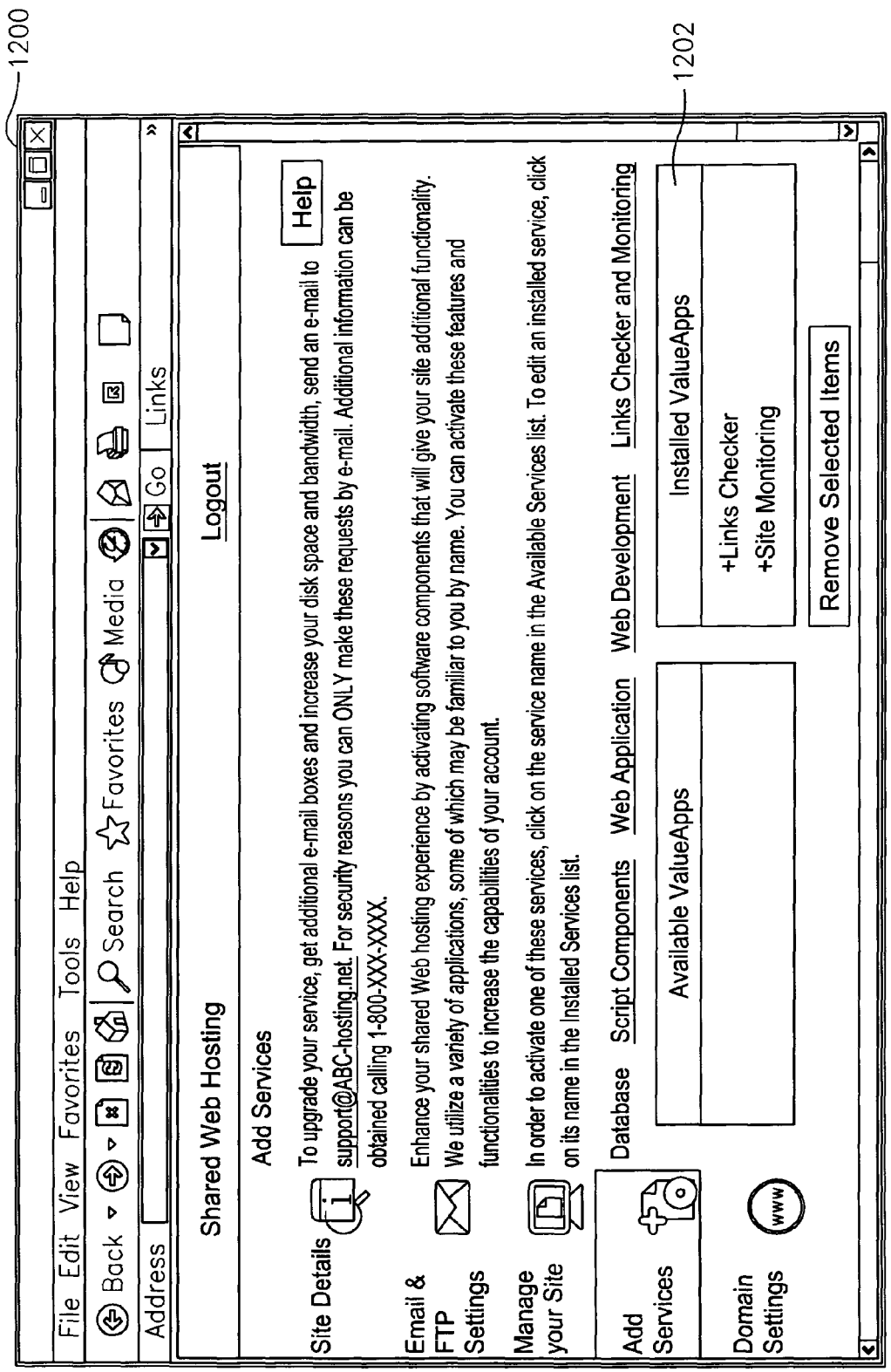
FIG. 12 depicts a user interface screen presented to a user upon subscribing to the links checker services and the site monitoring services in exemplary embodiments.

The user then selects a provider from the dialog box 500 at step 222, followed by 'Next' 504. The web manager application 110 presents a user interface screen 1200 (similar to the user interface screen 400), which provides the user with instructions for using the site monitoring service. As shown in the user interface screen 1200 of FIG. 12, the user has subscribed to the links checker services and the site monitoring services.

Figure 13:
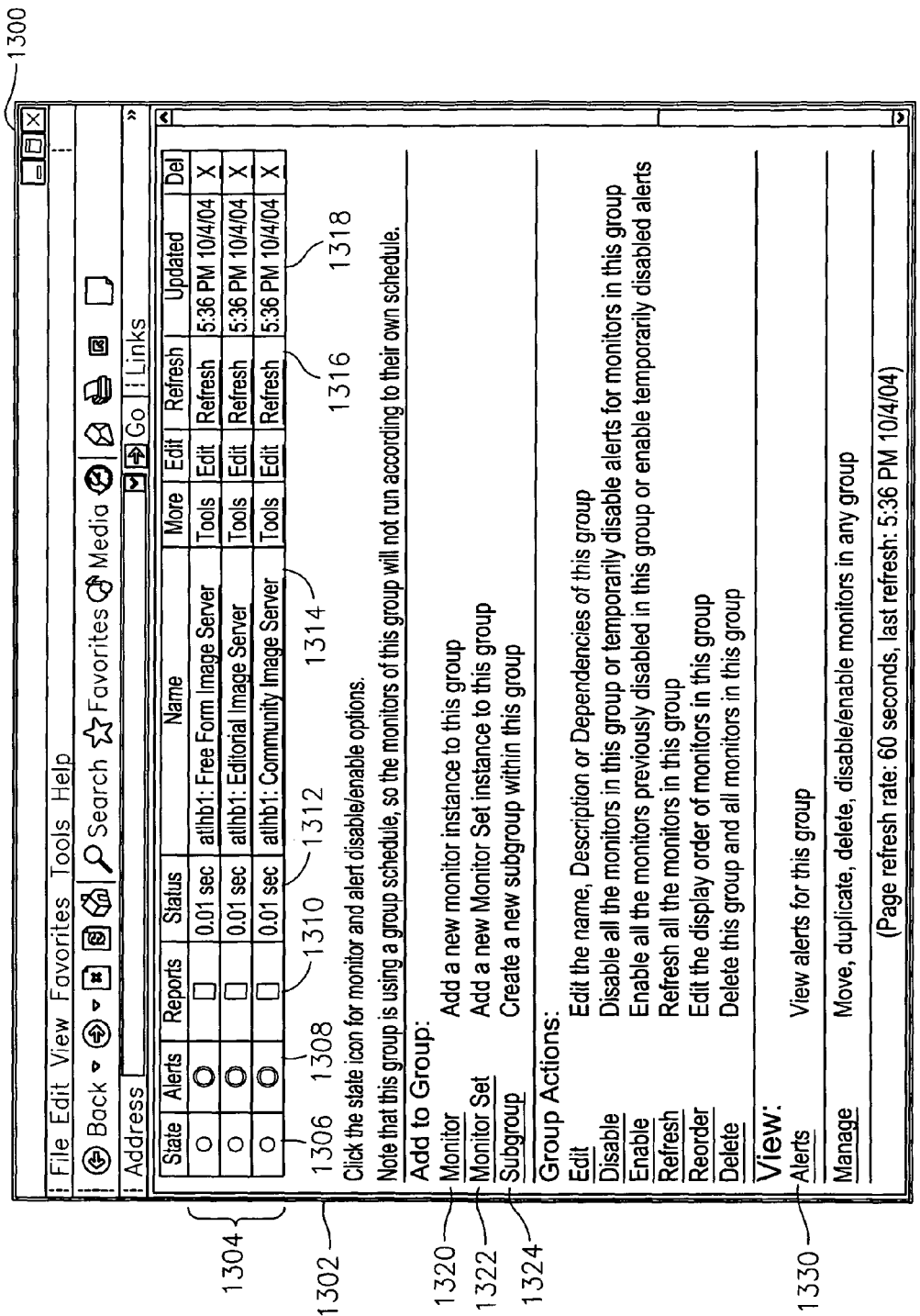
FIG. 13 depicts a user interface screen of a monitor status page provided by the site monitoring services in exemplary embodiments.

The user may access the site monitoring services by selecting this option from the dialog box 1202 of user interface screen 1200. The web manager application 110 then provides a log in screen (not shown) whereby the web manager application 110 verifies the user's identity and access permissions at step 224. Once verified, the web manager application 110 presents a monitor status page at step 226, a sample of which is shown in the user interface screen 1300 of FIG. 13. The monitor status page 1302 of user interface screen 1300 provides summarized information for user-added monitors along with their current status. The status reflects the most recent update. The user may add, edit, and/or delete monitors as well as group the monitors in a useful fashion. Each monitor refers to a device or program logic that analyzes various performance characteristics of elements of the subscriber's website. The elements may include applications, processors, and databases, to name a few. The characteristics that are analyzed may include processor speed, bandwidth utilization, memory consumption, etc.

As shown in the monitor status page 1302, there are three monitors 1304 currently selected by the user. Each monitor provides information regarding the state 1306 of the monitor, issued alerts 1308, and reports 1310, which in turn, may be color-coded for quick reference. Each of the monitors may also provide status information 1312, the monitor name 1314, and a refresh function 1316, which enables the user to receive real-time status information for a particular monitor (as opposed to the most recent update). Also provided is a date and time 1318 of the most recent update. For example, by selecting the refresh function 1316, the web manager application 110 may actively initiate a performance check based upon the user configurations and provide responses with a real-time status of the corresponding system or element being monitored.

Figure 14:
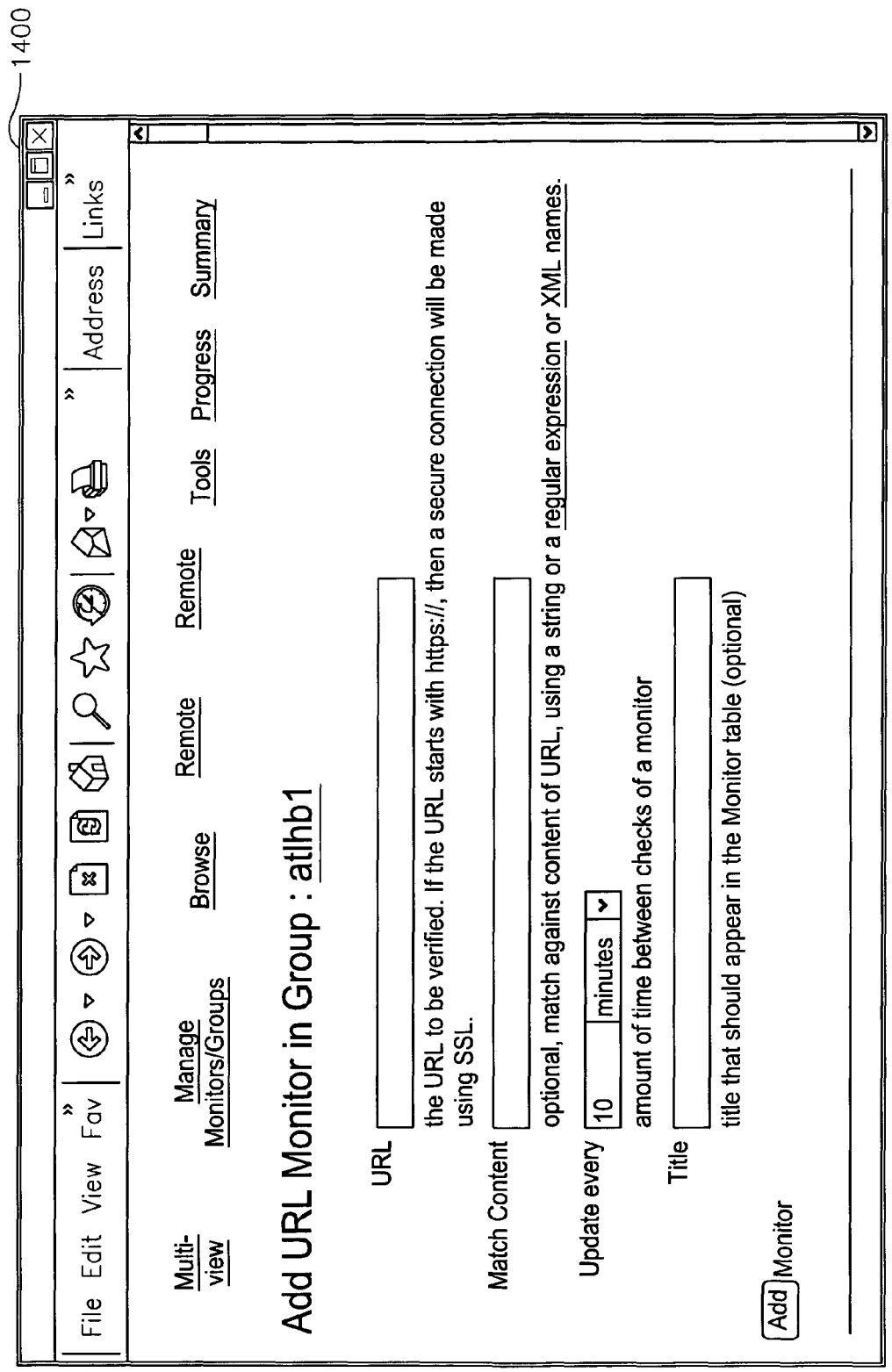
FIG. 14 depicts a user interface screen for configuring monitors for use in implementing the site monitoring services in exemplary embodiments.

The user may add a new monitor to the group via option 1320, add a new monitor set instance to an existing group via option 1322, and/or create a new subgroup within a current group via option 1324. These functions are implemented by the user at step 228. For example, if the user selects the 'Monitor' option 1320, the web manager application 110 presents a user interface screen 1400, a sample of which is shown in FIG. 14. As shown in FIG. 14, the user has opted to add a new monitor to the group 'atlhb1'. Additional functions are available through the monitor status page 1302. For example, the user may edit, disable, enable, refresh, reorder, and delete monitors as desired. These functions are implemented at step 230.

Figure 15:
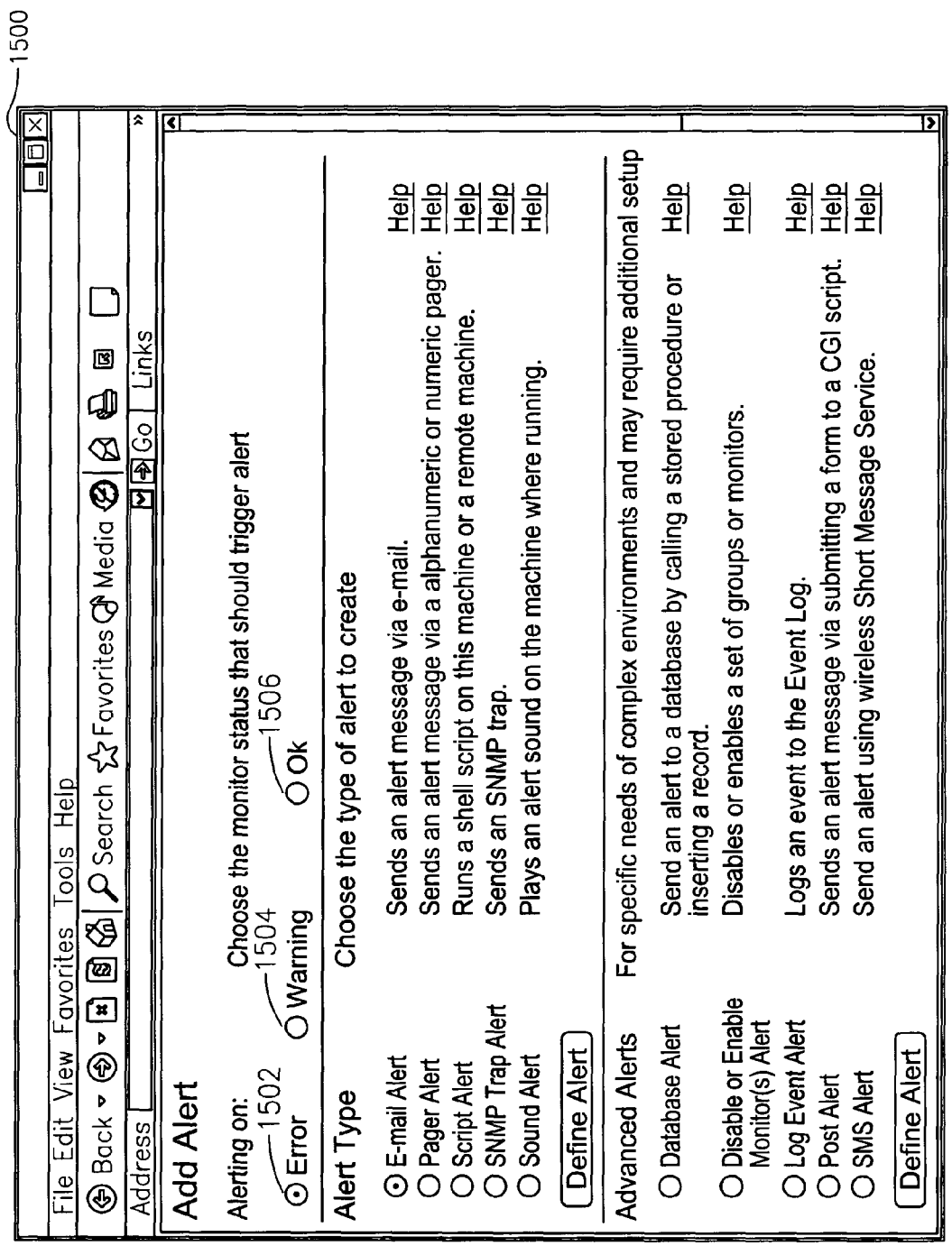
FIG. 15 depicts a user interface screen for configuring alerts via the site monitoring services in exemplary embodiments.

In addition, the user may choose to view the alerts via the monitor status page 1302 (e.g., via the icon in the 'Alerts' column 1308) or may configure specific alerts to be generated via the Alerts option 1330 at step 232. If selected, the web manager application 110 presents the user with a user interface screen 1500, a sample of which is shown in FIG. 15. The user interface screen 1500 prompts the user to select the monitor status that will trigger the alert (i.e., one of statuses 1502, 1504, and 1506). The user is then prompted to select a type of alert (e.g., email alert, pager alert, script alert, SNMP trap alert, sound alert, etc.). In addition, the user may configure advanced alerts (e.g., database alert, disable or enable monitor alert, log event alert, post alert, SMS alert, etc.). By entering these selections, each monitor will generate an alert upon detecting a problem.

Once the user has configured the site monitoring service selections, the site monitoring service begins to monitor the performance of the user's website in accordance with the configured settings at step 234. Alerts are generated and transmitted to the user at step 236 as a result of the monitoring, if this option has been configured.

As described above, exemplary embodiments can be implemented in the form of computer-implemented processes and apparatuses for practicing those processes. Exemplary embodiments can also be implemented in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be implemented in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing website management services, comprising:
   forwarding, by a website management server, a web page to a client device, the web page including options that are configurable by a user of the client device for selecting at least one of
   verifying operability of web page links for a website owned by the user of the client device and monitoring performance characteristics of the website, the website management server hosting the website owned by the client device and providing subscription-based technical services to the client device via at least one provider entity; and
   receiving, from the client device, at least one selected option corresponding to the verifying operability of web page links for the website and monitoring performance characteristics of the website.

2. The method of claim 1, further comprising:
   receiving, at the website management server, a selection from the client device corresponding to the at least one provider entity, the at least one provider entity selected from a list of provider entities displayed on the web page, each of the provider entities providing
   at least one of the verifying operability of web page links and the monitoring performance characteristics of the website; and
   coordinating, by the website management server, implementation of the verifying operability of web page links and the monitoring performance characteristics of the website conducted via selected at least one provider entity;
   wherein the provider entities are third-party entities with respect to the website management server.

3. The method of claim 1, further comprising receiving from the client device
   a mode of receiving results of at least one of the verifying operability of web page links and the monitoring performance characteristics of the website, the mode of receiving results comprising one of the options that are configurable by a user of the client device.

4. The method of claim 1, wherein the options that are configurable further include a frequency for performing the verifying and at least one of:
   a maximum number of web page links to be verified;
   a maximum number of hops to be verified; and
   a maximum period of time link verification will continue before timing out.

5. The method of claim 1, further comprising:
   receiving a specified a format from the client device for receiving results of the verifying operability of web page links, the specified format comprising one of the options that are configurable by the user of the client device.

6. The method of claim 1, further comprising providing results of the verifying operability of the web page links including at least one of:
   a number of link errors detected over a specified period of time; and
   a number of image in link errors detected over a specified period of time.

7. The method of claim 1, further comprising providing results of the monitoring performance characteristics of the website, including:
   a state of a monitor selected to inspect performance characteristics of the website;
   an alert generated for the monitor indicating the presence of a detected issue; and
   a report for the monitor including details of the results.

8. A system for providing website management services, comprising:
   a website management server implemented by a computer processor; and
   a web manager application executing on the website management server, the web manager application implementing a method, the method comprising:
   forwarding, by the website management server, a web page to a client device, the web page including options that are configurable by a user of the client device for selecting at least one of verifying operability of web page links for a website owned by the user of the client device and monitoring performance characteristics of the website, the website management server hosting the website owned by the client device and providing subscription-based technical services to the client device via at least one provider entity; and
   receiving, from the client device, at least one selected option corresponding to the verifying operability of web page links for the website and monitoring performance characteristics of the website.

9. The system of claim 8, wherein the web manager application further performs:
   receiving, at the website management server, a selection from the client device corresponding to the at least one provider entity, the at least one provider entity selected from a list of provider entities displayed on the web page, each of the provider entities providing at least one of the verifying operability of web page links and the monitoring performance characteristics of the website; and
   coordinating, via the website management server, implementation of the verifying operability of web page links and the monitoring performance characteristics of the website conducted via selected at least one provider entity;
   wherein the provider entities are third-party entities with respect to the website management server.

10. The system of claim 8, wherein the web manager application further performs:
    receiving from the client device a mode of receiving results of at least one of the verifying operability of web page links and the monitoring performance characteristics of the website, the mode of receiving results comprising one of the options that are configurable by a user of the client device.

11. The system of claim 8, wherein the options that are configurable further include a frequency for performing the verifying and at least one of:
    a maximum number of web page links to be verified;
    a maximum number of hops to be verified; and
    a maximum period of time a link verification will continue before timing out.

12. The system of claim 8, wherein the web manager application further performs:
    receiving a specified format from the client device for receiving results of the verifying operability of web page links, the specified format comprising one of the options that are configurable by the user of the client device.

13. The system of claim 8, wherein the web manager application further performs providing results of the verifying operability of the web page links including at least one of:
- a number of link errors detected over a specified period of time; and
- a number of image in link errors detected over a specified period of time.

14. A computer program product for providing website management services, the computer program product including instructions for implementing a method, comprising:
- forwarding a web page to a client device, the web page including options that are configurable by a user of the client device for selecting at least one of
- verifying operability of web page links for a website owned by the user of the client device and
- monitoring performance characteristics of the website, the website management server hosting a website owned by the client device and providing subscription-based technical services to the client device via at least one provider entity; and
- receiving, from the client device, at least one selected option corresponding to the verifying operability of web page links for the website and monitoring performance characteristics of the website.

15. The computer program product of claim 14, further comprising instructions for implementing:
- receiving, at the website management server, a selection from the client device corresponding to the at least one provider entity, the at least one provider entity selected from a list of provider entities displayed on the web page, each of the provider entities providing at least one of the verifying operability of web page links and the monitoring performance characteristics of the website; and
- coordinating implementation of the verifying operability of web page links and the monitoring performance characteristics of the website conducted via selected at least one provider entity;

wherein the provider entities are third-party entities with respect to the website management server.

16. The computer program product of claim 14, further comprising instructions for implementing:
- receiving from the client device a mode of receiving results of at least one of the verifying operability of web page links and the monitoring performance characteristics of the website, the mode of receiving results comprising one of the options that are configurable by a user of the client device.

17. The computer program product of claim 14, wherein the options that are configurable further include a frequency for performing the verifying and at least one of:
- a maximum number of web page links to be verified;
- a maximum number of hops to be verified; and
- a maximum period of time a link verification will continue before timing out.

18. The computer program product of claim 14, further comprising instructions for performing:
- receiving a specified format from the client device for receiving results of the verifying operability of web page links, the specified format comprising one of the options that are configurable by the user of the client device.

19. The computer program product of claim 14, further comprising instructions for providing results of the verifying operability of the web page links including at least one of:
- a number of link errors detected over a specified period of time; and
- a number of image in link errors detected over a specified period of time.

20. The computer program product of claim 14, further comprising instructions for providing results of the monitoring performance characteristics of the website, including:
- a state of a monitor selected to inspect performance characteristics of the website;
- an alert generated for the monitor indicating the presence of a detected issue; and
- a report for the monitor including details of the results.

* * * * *